April 4, 1944.     F. E. ALTMAN     2,346,061

PHOTOGRAPHIC OBJECTIVE

Filed May 11, 1942

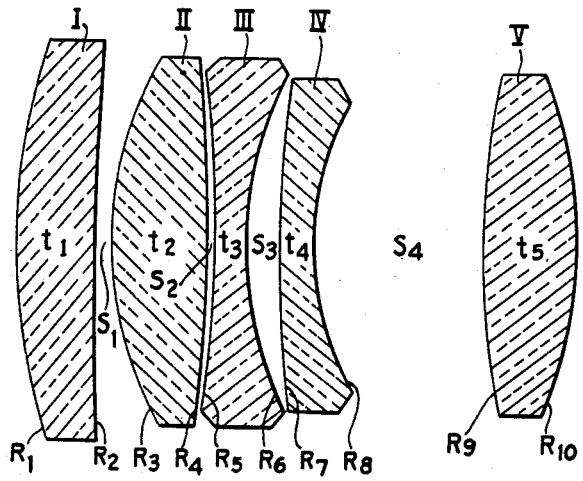

| EXAMPLE 1 | | f/1.9 | | f = 100 mm. |
|---|---|---|---|---|
| LENS | $N_D$ | $\nu$ | RADII | THICKNESSES |
| I | 1.744 | 45.7 | $R_1 = +\ 81.1$ mm | $t_1 = 10.2$ mm |
| | | | $R_2 = +7443.0$ | $S_1 = 2.0$ |
| II | 1.620 | 60.4 | $R_3 = +\ 46.6$ | $t_2 = 11.7$ |
| | | | $R_4 = -1519.0$ | $S_2 = 1.24$ |
| III | 1.617 | 36.6 | $R_5 = -\ 197.4$ | $t_3 = 4.1$ |
| | | | $R_6 = +\ 43.4$ | $S_3 = 3.8$ |
| IV | 1.689 | 30.9 | $R_7 = +\ 228.2$ | $t_4 = 4.2$ |
| | | | $R_8 = +\ 37.0$ | $S_4 = 21.3$ |
| V | 1.620 | 60.4 | $R_9 = +\ 102.8$ | $t_5 = 11.4$ |
| | | | $R_{10} = -\ 56.8$ | |

| EXAMPLE 2 | | f/1.9 | | f = 100 mm. |
|---|---|---|---|---|
| LENS | $N_D$ | $\nu$ | RADII | THICKNESSES |
| I | 1.744 | 45.7 | $R_1 = +\ 80.5$ mm | $t_1 = 9.7$ mm |
| | | | $R_2 = +9680.1$ | $S_1 = 3.1$ |
| II | 1.620 | 60.4 | $R_3 = +\ 46.2$ | $t_2 = 11.6$ |
| | | | $R_4 = -1509.0$ | $S_2 = 1.24$ |
| III | 1.617 | 36.6 | $R_5 = -\ 195.5$ | $t_3 = 4.0$ |
| | | | $R_6 = +\ 43.0$ | $S_3 = 3.8$ |
| IV | 1.689 | 30.9 | $R_7 = +\ 225.8$ | $t_4 = 4.1$ |
| | | | $R_8 = +\ 36.7$ | $S_4 = 20.2$ |
| V | 1.620 | 60.4 | $R_9 = +\ 114.2$ | $t_5 = 12.8$ |
| | | | $R_{10} = -\ 55.6$ | |

FRED E. ALTMAN
INVENTOR

BY *Murphy M Perkins*
*F. Emerson Holmes*
ATTY & AG'T

Patented Apr. 4, 1944

2,346,061

UNITED STATES PATENT OFFICE 2,346,061

PHOTOGRAPHIC OBJECTIVE

Fred E. Altman, Rochester, N. Y., assignor to Eastman Kodak Company, Rochester, N. Y., a corporation of New Jersey Application May 11, 1942, Serial No. 442,422

6 Claims. (Cl. 88—57)

This invention relates to high aperture photographic objectives.

It has for its main object improved correction of field and of astigmatism at high aperture and over fairly wide angles. The present invention actually leads to a lens in which the astigmatism, the field curvature and the lateral color are practically zero out to 14 degrees from the axis, with a working aperture of f/1.9. Furthermore, the rim ray agreement, the spherical aberration, the coma and chromatic aberration on the axis are also practically fully corrected.

It is also an object of the invention to provide a lens practically free from distortion.

According to the invention, the above objects are obtained in a highly modified triplet system consisting of a front and a rear part separated by an air space between .05F and .5F where F is the focal length of the objective. The invention is not particularly concerned with the form of the rear part except that it has positive power. In fact, the rear part may consist of a single element. However, according to the invention the front part must include at least four components separated by air, two of the components having positive power and being nearer the front of the objective than the other two which have negative power. It will be noted that, in a sense, this invention is a modification of that described in my copending application, Serial No. 442,421, filed concurrently herewith.

In a preferred embodiment of the invention the front part of the lens consists entirely of these four components without any intermediate components, and, in fact, each of the components may be a simple element. In this embodiment the front surface of each of the positive components and the rear surface of each of the negative components should be more strongly curved than the other surfaces respectively of these components.

When all of the features of the preferred embodiment of the invention are incorporated into a lens, the radii of curvatures of the outer surfaces of the four components in the front part of the lens have the following values taken in order from the front of the objective: $R_1$ between $+.5F$ and $+5F$, $R_2$ greater than $+5F$ and $-5F$, $R_3$ between $+.25F$ and $+2.5F$, $R_4$ greater than $+5F$ and $-5F$, $R_5$ between $-F$ and infinity, $R_6$ between $+.25F$ and $+2.5F$, $R_7$ between $+F$ and infinity, $R_8$ between $+.25F$ and $+2.5F$. In the preferred embodiment of the invention in which each of these four components is a single element, there are no cemented surfaces, and hence, the above radii of curvature refer to all of the refractive surfaces in the front part of the lens. In this preferred embodiment of the invention just described, the exceptionally flat field and other corrections are partly due to the inclusion of an air space of negative power between the second and third components. The accompanying drawing shows:

The cross section of a lens according to the preferred embodiment of the invention and two tables giving data have slightly different embodiments thereof.

The specifications corresponding to the lens illustrated are as follows:

Example 1

| f/1.9 | | | | f=100 mm. |
|---|---|---|---|---|
| Lens | $N_D$ | V | Radii | Thicknesses |
| I | 1.744 | 45.7 | $R_1=+81.1$ mm. $R_2=+7443.0$ | $t_1=10.2$ mm. $S_1=2.0$ |
| II | 1.620 | 60.4 | $R_3=+46.6$ $R_4=-1519.0$ | $t_2=11.7$ $S_2=1.24$ |
| III | 1.617 | 36.6 | $R_5=-197.4$ $R_6=+43.4$ | $t_3=4.1$ $S_3=3.8$ |
| IV | 1.689 | 30.9 | $R_7=+228.2$ $R_8=+37.0$ | $t_4=4.2$ $S_4=21.3$ |
| V | 1.620 | 60.4 | $R_9=+102.8$ $R_{10}=-56.8$ | $t_5=11.4$ |

Example 2

| f/1.9 | | | | f=100 mm. |
|---|---|---|---|---|
| Lens | $N_D$ | V | Radii | Thicknesses |
| I | 1.744 | 45.7 | $R_1=+80.5$ mm. $R_2=+9680.1$ | $t_1=9.7$ mm. $S_1=3.1$ |
| II | 1.620 | 60.4 | $R_3=+46.2$ $R_4=-1509.0$ | $t_2=11.6$ $S_2=1.24$ |
| III | 1.617 | 36.6 | $R_5=-195.5$ $R_6=+43.0$ | $t_3=4.0$ $S_3=3.8$ |
| IV | 1.689 | 30.9 | $R_7=+225.8$ $R_8=+36.7$ | $t_4=4.1$ $S_4=20.2$ |
| V | 1.620 | 60.4 | $R_9=+114.2$ $R_{10}=-55.6$ | $t_5=12.8$ |

It will be noted that both of the examples meet all of the requirements of the preferred embodiment of the invention listed above. The front part of the lens consists of components I, II, III, and IV and the rear part of the lens consists of a single component V, but the invention is not particularly concerned with the form of the latter component which may have practically any of the forms proposed for highly modified triplets of this general type.

Having thus described two preferred embodiments of my invention, I wish to point out that it is not limited to these particular structures but is of the scope of the appended claims.

What I claim and desire to secure of Letters Patent of the United States is:

1. A high aperture photographic objective consisting of five simple uncemented lens elements of which the front two are positive with their respective front surfaces more strongly curved, the next two are negative with their respective rear surfaces more strongly curved and the rear element is positive, and in which the rear air space is greater than the sum of the other three air spaces.

2. A high aperture objective consisting of a front and a rear part separated by an air space between .05F and .5F where F is the focal length of the objective, the rear part having positive power and the front part consisting of at least four components each bounded by air, two of said four having positive power and being nearer the front of the objective than the other two which have negative power.

3. A high aperture objective consisting of a front and a rear part separated by an airspace between .05F and .5F where F is the focal length of the objective, the rear part having positive power and the front part consisting of four air spaced components, the front two of which are positive with their front surfaces respectively the more strongly curved and the next two being negative with their rear surfaces respectively the more strongly curved.

4. An objective according to claim 3 in which each of said four components is a single element.

5. An objective according to claim 3 in which $R_1$ is between $+.5F$ and $+5F$
$R_2$ is greater than $+5F$ and $-5F$
$R_3$ is between $+.25F$ and $+2.5F$
$R_4$ is greater than $+5F$ and $-5F$
$R_5$ is between $-F$ and $\infty$
$R_6$ is between $+.25F$ and $+2.5F$
$R_7$ is between $+F$ and $\infty$, and
$R_8$ is between $+.25F$ and $+2.5F$ where $R_1$ to $R_8$ are respectively the radii of curvature of the bounding surfaces of said four components starting from the front and the $+$ and $-$ signs refer respectively to surfaces convex and concave to the front.

6. An objective according to claim 3 in which the rear surface of the second component and the front surface of the third component are separated by an air space of negative power.

FRED E. ALTMAN.